US012481363B2

(12) United States Patent
Hobbs

(10) Patent No.: US 12,481,363 B2
(45) Date of Patent: *Nov. 25, 2025

(54) HANDWHEELS AND ASSOCIATED CONTROL CONSOLES

(71) Applicant: Boyd Randolph Hobbs, Los Angeles, CA (US)

(72) Inventor: Boyd Randolph Hobbs, Los Angeles, CA (US)

(73) Assignee: Nodal Film Systems LLC, Los Angeles, CA (US)

( * ) Notice: Subject to any disclaimer, the term of this patent is extended or adjusted under 35 U.S.C. 154(b) by 32 days.

This patent is subject to a terminal disclaimer.

(21) Appl. No.: 18/419,044

(22) Filed: Jan. 22, 2024

(65) Prior Publication Data
US 2024/0160291 A1    May 16, 2024

Related U.S. Application Data

(63) Continuation of application No. 17/720,189, filed on Apr. 13, 2022, now Pat. No. 11,977,685, which is a continuation of application No. 16/709,711, filed on Dec. 10, 2019, now Pat. No. 11,366,525, which is a
(Continued)

(51) Int. Cl.
| | | |
|---|---|---|
| *H02K 1/27* | (2022.01) | |
| *G03B 17/56* | (2021.01) | |
| *G06F 3/01* | (2006.01) | |
| *G06F 3/0362* | (2013.01) | |
| *H02K 24/00* | (2006.01) | |
| *F16M 11/20* | (2006.01) | |
| *H04N 23/54* | (2023.01) | |
| *H04N 23/66* | (2023.01) | |
| *H04N 23/695* | (2023.01) | |

(52) U.S. Cl.
CPC ............. *G06F 3/016* (2013.01); *G03B 17/56* (2013.01); *G06F 3/0362* (2013.01); *H02K 24/00* (2013.01); *F16M 11/2021* (2013.01); *H04N 23/54* (2023.01); *H04N 23/66* (2023.01); *H04N 23/695* (2023.01)

(58) Field of Classification Search
CPC ........ H02K 24/00; H02K 11/21; H02K 29/00; G03B 17/561
See application file for complete search history.

(56) References Cited

U.S. PATENT DOCUMENTS

| | | |
|---|---|---|
| 8,125,564 B2 | 2/2012 | Kozlov |
| 8,485,740 B1 | 7/2013 | Chapman |
| 9,673,684 B2 | 6/2017 | Shaw |

(Continued)

FOREIGN PATENT DOCUMENTS

WO    2018157591 A1    9/2018

*Primary Examiner* — Muhammad S Islam
(74) *Attorney, Agent, or Firm* — Lynch LLP

(57) ABSTRACT

Handwheel systems, including control consoles incorporating handwheels of the inventive subject matter, are described in this application. Handwheels described in this application can be used to control remotely located motors, especially those configured to control camera movements. To make it easier for camera operators to control remotely located motors using handwheels, those handwheels can be incorporated into a control console. Control consoles of the inventive subject matter can include several dials, toggle buttons, a display, and a variety of different inputs and outputs.

14 Claims, 7 Drawing Sheets

Related U.S. Application Data continuation-in-part of application No. 16/027,116, filed on Jul. 3, 2018, now abandoned.

(56) References Cited

U.S. PATENT DOCUMENTS

| | | | |
|---|---|---|---|
| 9,673,688 | B2 | 6/2017 | Shaw |
| 9,800,109 | B2 | 10/2017 | Shaw |
| 9,859,763 | B2 | 1/2018 | Shaw |
| 10,170,953 | B2 | 1/2019 | Shaw |
| 10,211,694 | B1 | 2/2019 | Shaw |
| 10,256,690 | B2 | 4/2019 | Shaw |
| 10,644,579 | B2 * | 5/2020 | Nerubenko ............ F16F 15/02 |
| 11,005,322 | B2 | 5/2021 | Milheim et al. |
| 11,121,614 | B2 | 9/2021 | Milheim |
| 11,336,130 | B1 | 5/2022 | Shaw et al. |
| 11,527,933 | B2 | 12/2022 | Shaw et al. |
| 11,855,484 | B2 | 12/2023 | Milheim et al. |
| 2004/0184798 | A1 | 9/2004 | Dumm |
| 2005/0007553 | A1 | 1/2005 | Romanoff |
| 2007/0050139 | A1 * | 3/2007 | Sidman ............ F16M 11/18 318/649 |
| 2007/0053681 | A1 | 3/2007 | Arbuckle |
| 2010/0128122 | A1 | 5/2010 | Wright |
| 2013/0257602 | A1 * | 10/2013 | Higbie ............ G08B 6/00 340/407.2 |
| 2014/0216023 | A1 | 8/2014 | Rabhi |
| 2014/0218603 | A1 | 8/2014 | Stone |
| 2015/0084446 | A1 | 3/2015 | Atar |
| 2017/0241589 | A1 | 8/2017 | Wang et al. |
| 2017/0363932 | A1 | 12/2017 | Lim et al. |
| 2018/0283601 | A1 | 10/2018 | Wei |
| 2019/0063668 | A1 | 2/2019 | Wei |
| 2019/0074747 | A1 | 3/2019 | Shukla |
| 2020/0014316 | A1 * | 1/2020 | Hobbs ............ H02P 31/00 |
| 2020/0116195 | A1 | 4/2020 | Chen et al. |
| 2020/0145577 | A1 | 5/2020 | Enke et al. |
| 2021/0135549 | A1 | 5/2021 | Lee et al. |
| 2021/0218304 | A1 | 7/2021 | Schuler et al. |
| 2021/0387580 | A1 | 12/2021 | Canones |
| 2023/0216363 | A1 | 7/2023 | Hobbs |

* cited by examiner

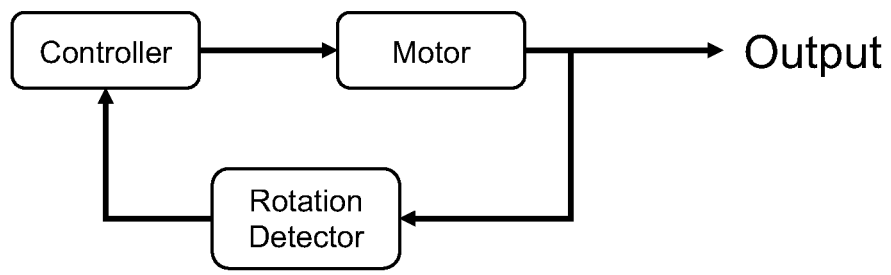
FIG. 7
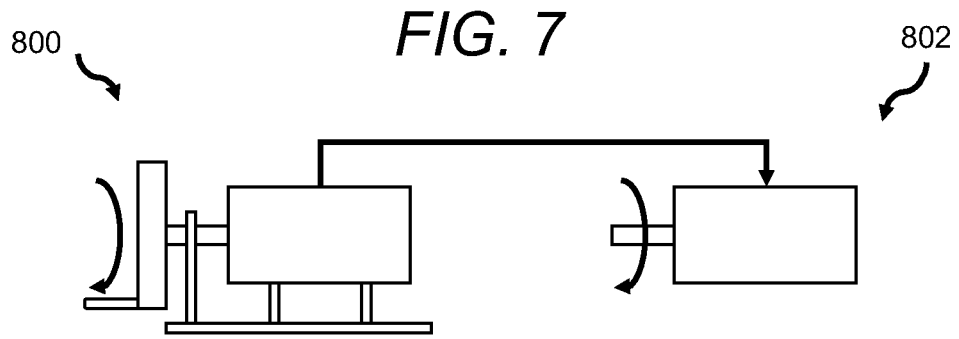
FIG. 8
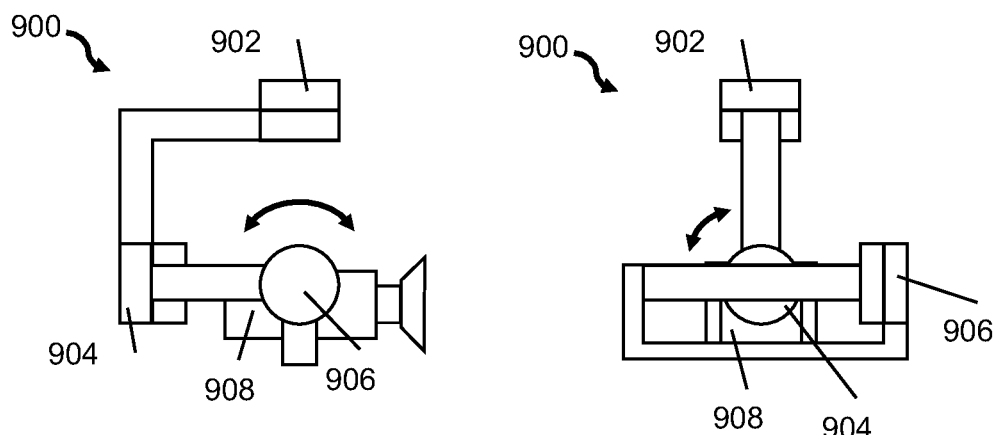
FIG. 9A
FIG. 9B
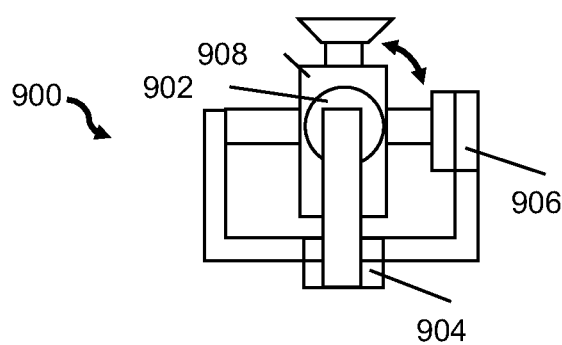
FIG. 9C

HANDWHEELS AND ASSOCIATED CONTROL CONSOLES

This application is a continuation of and claims priority to U.S. patent application Ser. No. 17/720189 filed Apr. 13, 2022, which is a continuation of U.S. patent application Ser. No. 16/709711 filed Dec. 10, 2019, issued as U.S. Pat. No. 11,366,525 on Apr. 16, 2020, which is a continuation-in-part of US patent application Ser. No. 16/027116 filed Jul. 3, 2018.

FIELD OF THE INVENTION

The field of the invention is motor-assisted handwheels and control consoles integrating motor-assisted handwheels.

BACKGROUND

The background description includes information that may be useful in understanding the present invention. It is not an admission that any of the information provided in this application is prior art or relevant to the presently claimed invention, or that any publication specifically or implicitly referenced is prior art.

A "fly-by-wire" handwheel system that incorporates haptic feedback to simulate rotational inertia. Applying force to the handwheel to turn it not only causes the handwheel to turn, but a feedback system causes the wheel to feel heavier than it actually is. Historically, handwheels for camera mounts were made smooth by virtue of the mass of the system that is rotated by a handwheel, including the mass of the handwheel itself. Because of the weight of the entire system, handwheels in mechanical systems turned smoothly from manual force input to the system (e.g., mechanical handwheel systems had high rotational inertia).

But in new "fly-by-wire" systems, the feeling of weight disappears. Instead, electronic input is received that causes a remotely mounted motor to turn a camera. Thus, the individual giving input to the system never directly feels the weight of the camera system, which can lead to movements that are not smooth since the camera operator has very little feel for the weight of the system.

Several patents documents work to address smooth movements of cameras that are motor controlled, but none are directed to solutions that improve user experience via haptic feedback. Instead, the previous solutions work to remove human input entirely. For example, U.S. Pat. No. 8,125,564 to Kozlov et al. describes a gimbal system that facilitates steady camera movements using electric motors. U.S. Pat. No. 8,485,740 to Chapman describes a camera mount system with intricate electronics and motor controllers to create smooth camera movements, but this system also fails to contemplate the importance of feel when controlling a camera, and the system described here fails to give an operator a feel for the camera's movement.

Finally, US20050007553A1 to Romanoff et al. discusses a camera mounted on the end of a boom that, upon moving the boom, the camera is caused to stay focused on a particular location, where the camera's movements are controlled by electric motors. But the purpose of this system is to remove the operator entirely from the task of controlling the movement of the camera in favor of computer-controlled movements. This application fails to appreciate how a haptic feedback system can improve remote controlling of a camera's movements.

These and all other extrinsic materials discussed in this application are incorporated by reference in their entirety. Where a definition or use of a term in an incorporated reference is inconsistent or contrary to the definition of that term provided in this application, the definition of that term provided in this application applies and the definition of that term in the reference does not apply.

It has yet to be appreciated that a haptic feedback system can be used in a lightweight handwheel system to give the handwheel a simulated rotational inertia that is higher than its actual rotational inertia so that even a remotely controlled camera can feel heavy to a camera operator.

SUMMARY OF THE INVENTION

The present invention provides apparatus, systems, and methods in which handwheel systems that are used to remotely control the movements of a camera give haptic feedback to a user so the handwheel feels heavier than it actually is. These systems are useful to provide camera operators a feeling of weight even when remotely controlling a camera's movements.

In one aspect of the inventive subject matter, a digital handwheel system is contemplated. The digital handwheel system includes a motor having a rotor; a handwheel coupled with the rotor; a rotation detector configured to detect a rotation of the handwheel; and a controller electrically coupled with both the rotation detector and with the motor, where the controller is configured to operate a control system for the motor that uses the detected rotation of the handwheel to simulate a rotational inertia of the handwheel that is different from the handwheel's actual rotational inertia.

In some embodiments, the motor is a brushless DC motor. The rotation detector can include a rotary encoder, where, in some embodiments, the rotary encoder can be a conductive encoder, an optical encoder, an on-axis magnetic encoder, or an off-axis magnetic encoder. In some embodiments, the rotation detector is integrated into the motor.

It is contemplated that the motor can be an AC brushless motor, a DC brushless motor, a DC brushed motor, a direct drive motor, a linear motor, a servo motor, or a stepper motor. The simulated rotational inertia of the handwheel in some embodiments is greater than the actual rotational inertia of the handwheel.

In another aspect of the inventive subject matter, a digital handwheel system is contemplated that includes: a motor having an output; a handwheel coupled with the output, wherein the motor is positioned at least partially within the handwheel and concentrically within the handwheel; a rotation detector configured to detect rotation of the handwheel; and a controller electrically coupled with both the rotation detector and the motor, thereby forming a closed-loop control system for the motor that uses a detected rotation of the handwheel to simulate a rotational inertia of the handwheel that is different from the handwheel's actual rotational inertia.

In some embodiments, the motor is a brushless DC motor. The rotation detector can include a rotary encoder, where, in some embodiments, the rotary encoder can be a conductive encoder, an optical encoder, an on-axis magnetic encoder, or an off-axis magnetic encoder. In some embodiments, the rotation detector is integrated into the motor.

It is contemplated that the motor can be an AC brushless motor, a DC brushless motor, a DC brushed motor, a direct drive motor, a linear motor, a servo motor, or a stepper motor. The simulated rotational inertia of the handwheel in some embodiments is greater than the actual rotational inertia of the handwheel.

One should appreciate that the disclosed subject matter provides many advantageous technical effects including haptic feedback for handwheel systems. This haptic feedback system that cause a handwheel to feel heavier than it actually is facilitates improved remote camera controls by restoring the ability of a camera operator to feel the weight of the equipment they are operating.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 7 is a diagram showing a closed-loop control system.

FIG. 8 shows a handwheel system coupled with a remotely controlled motor.

FIG. 9A shows a side view of a remote head for a camera for use in association with embodiments of the inventive subject matter.

FIG. 9B shows a rear view of a remote head for a camera for use in association with embodiments of the inventive subject matter.

FIG. 9C shows a top view of a remote head for a camera for use in association with embodiments of the inventive subject matter.

DETAILED DESCRIPTION

Figure 1:
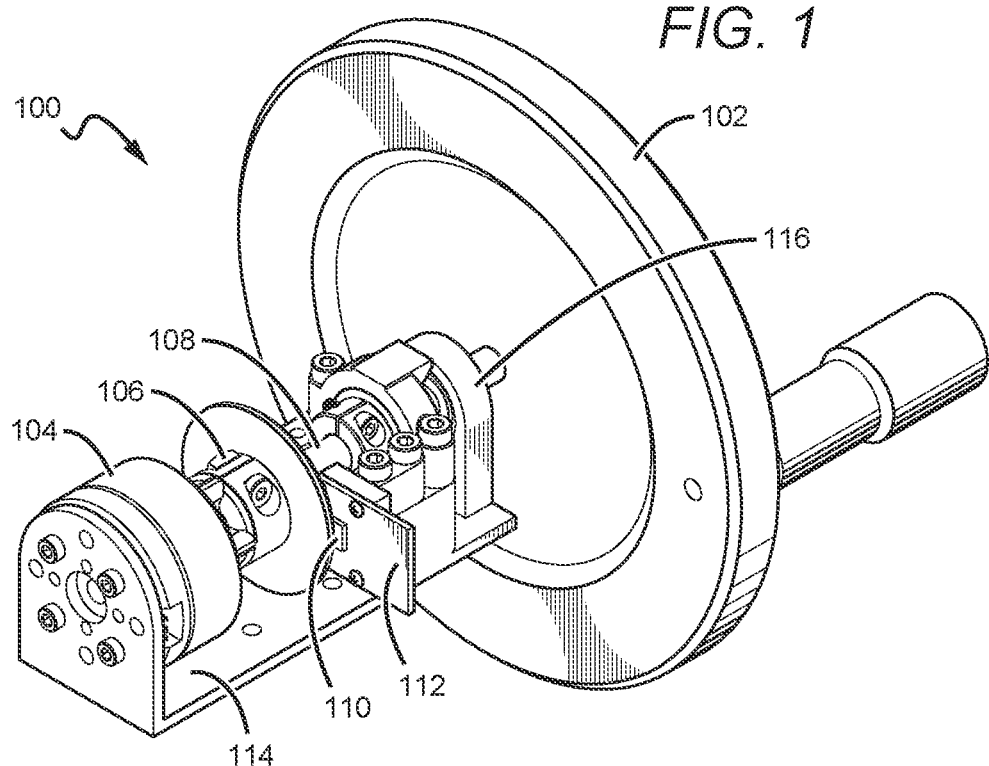
FIG. 1 is a perspective view of a handwheel system.
Figure 3:
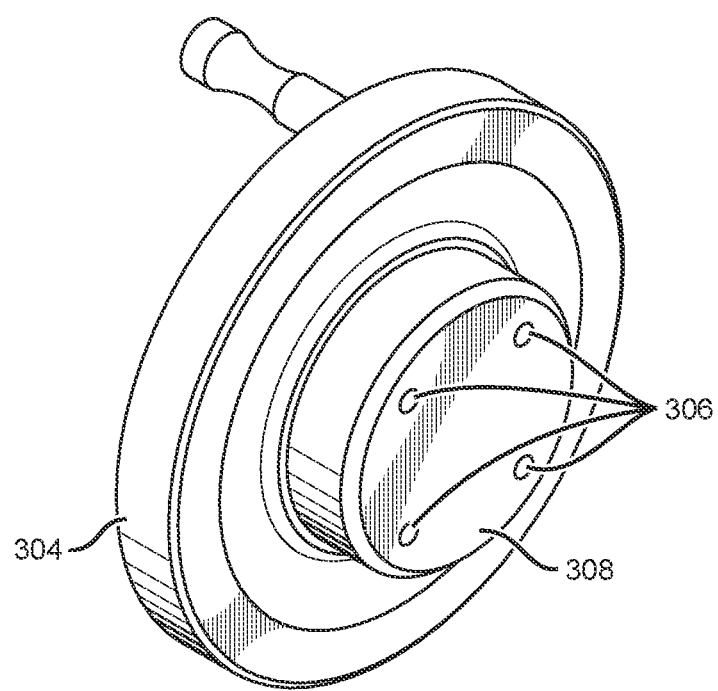
FIG. 3 is perspective view of another handwheel system.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed. Thus, all handwheel and associated control console embodiments described in this application can share features with all other handwheel and associated control console embodiments without deviating from the inventive subject matter.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

It should be noted that any language directed to a computer should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

In some embodiments of the inventive subject matter, a handwheel system is contemplated that provides haptic feedback to an operator, where the haptic feedback gives the handwheel a simulated feeling of weight and higher rotational inertia than actually exists for the handwheel naturally. This effect is created by coupling a handwheel to an electric motor, where movements of the handwheel (or, in some embodiments, the motor's output or even the motor's stator itself) are detected by a rotation detector (e.g., to determine angular position, angular velocity, and angular acceleration).

A controller is then electrically coupled with both the motor and the rotation detector, such that rotation information (e.g., position or change in position) collected by the rotation detector is transmitted to the controller, and the controller uses that information to control the motor's output. Thus, a closed-loop feedback system is created where position information from the motor is fed back into the controller, and the controller thus affects the motor's output according to that position information. A schematic of a closed-loop system is shown in FIG. 7.

When a handwheel system is implemented according to the inventive subject matter, movement information (e.g., one or any combination of angular position, angular velocity, and angular acceleration) of the handwheel itself can be used to cause a remotely located motor to turn to match the turning of the handwheel (e.g., at any ratio of handwheel turning to motor turning). For example, a remotely located motor can include a controller that causes the motor to turn according to the turning of the handwheel (e.g., a PID, PI, ID, PD, I, P, or D control scheme or even just a matching the turning of the handwheel according to angular position at any ratio of handwheel turns to remotely located motor turns).

Handwheels of the inventive subject matter are designed to receive manual input from a human user. As shown in the embodiments in FIGS. 1-6, handwheels can include a handle (e.g., a handle mounted to a component, such as a peg, that allows the handle to rotate about a fixed axis) that allows a user to turn the wheel smoothly as the wheel completes full revolutions.

Figure 2:
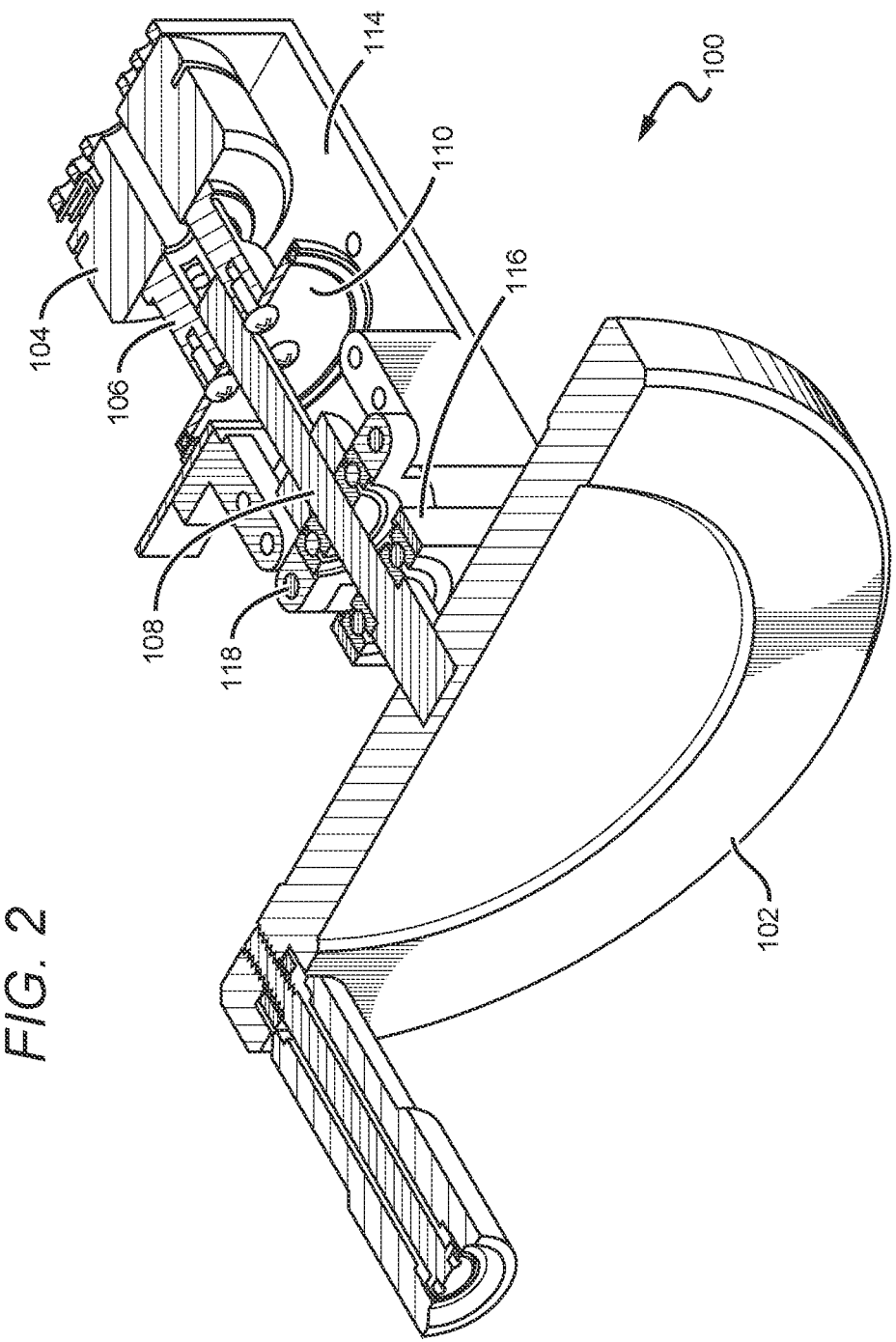
FIG. 2 is a cutaway perspective view of the handwheel system of FIG. 1.
Figure 4:
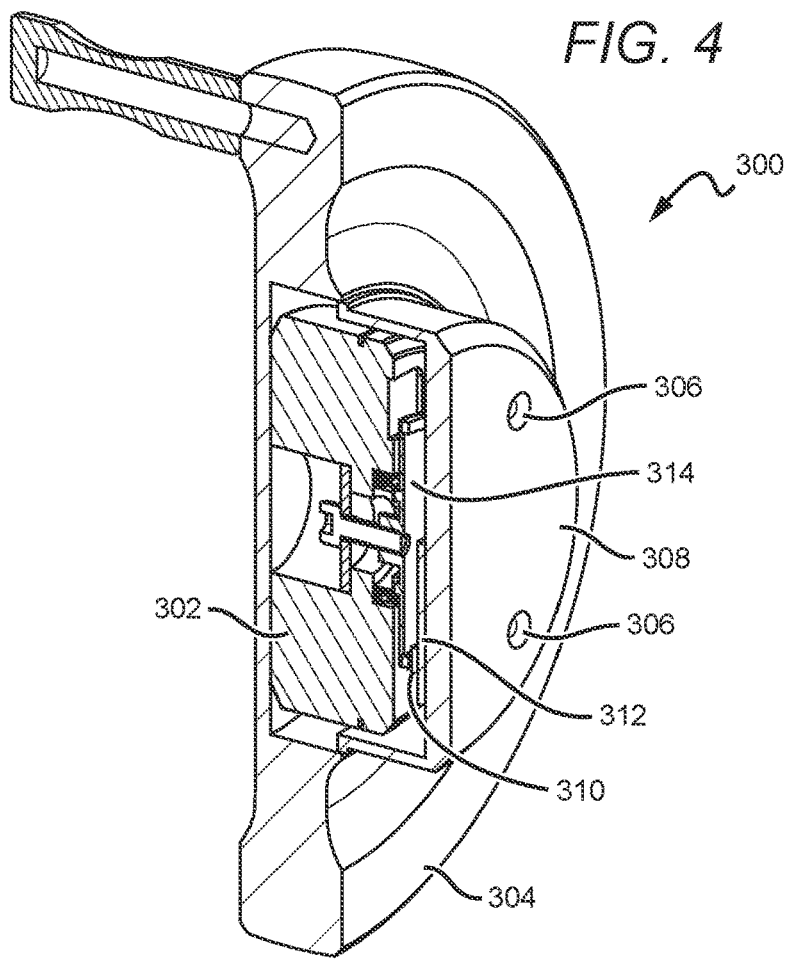
FIG. 4 is a cutaway view of the handwheel system of FIG. 3.
Figure 6:
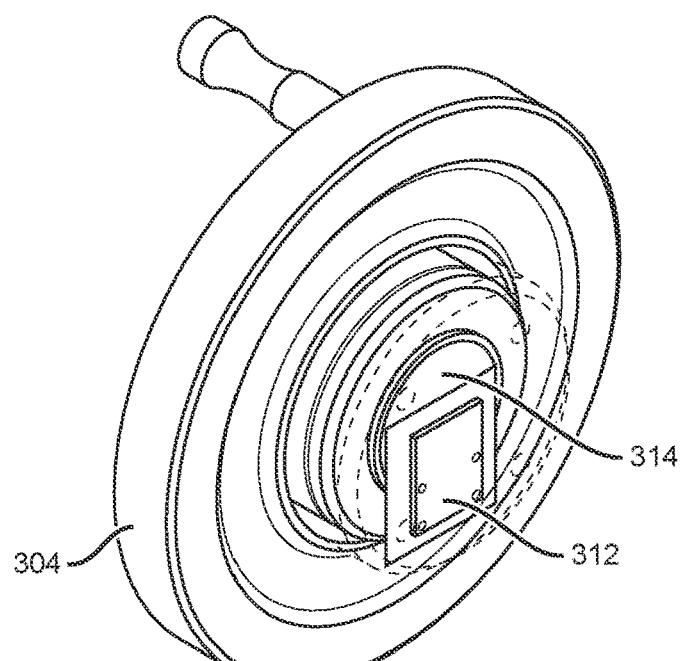
FIG. 6 is perspective view of the handwheel system of FIG. 3 with the mounting plate hidden.
Figure 5:
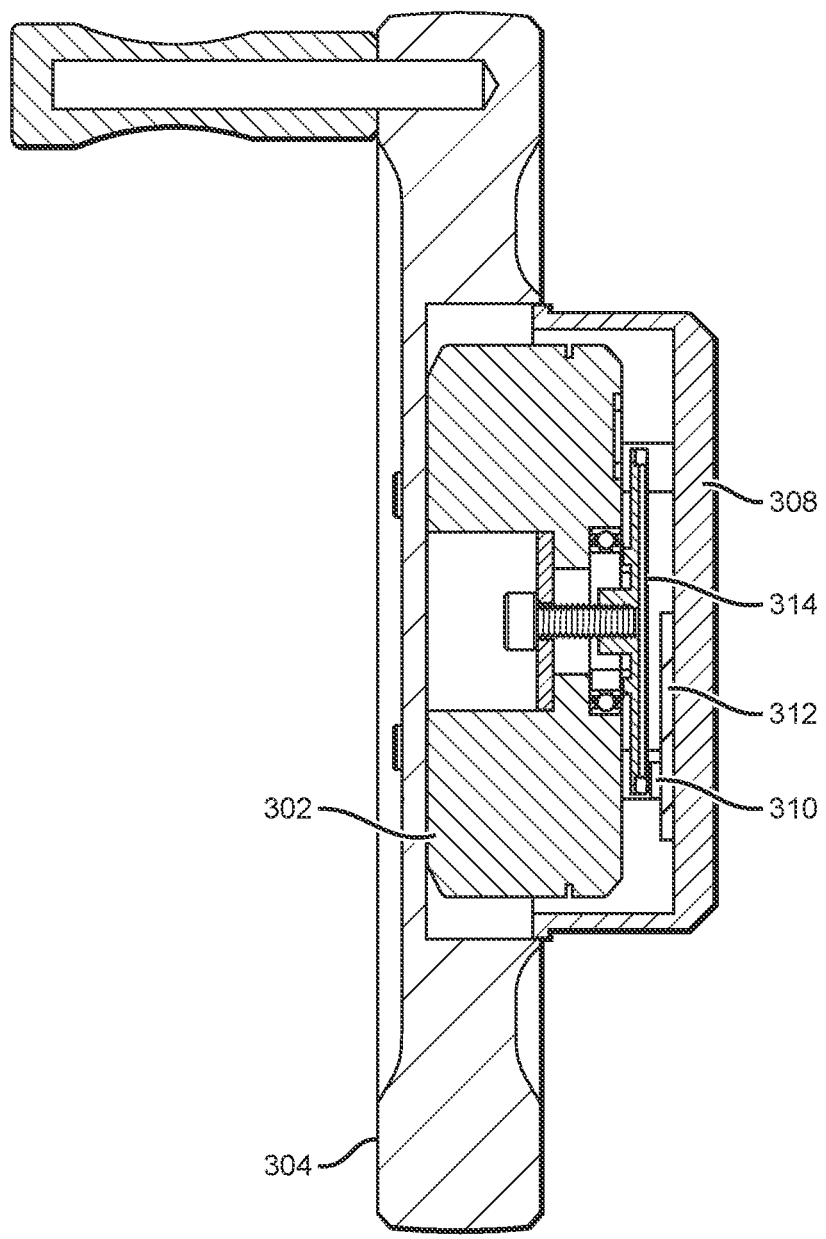
FIG. 5 is a side cutaway view of the handwheel system of FIG. 3.

In the handwheel system 100 shown in FIGS. 1-2, a handwheel 102 couples with a motor 104 in a linear configuration (e.g., each component is positioned along the axis of rotation of the handwheel). The handwheel 102 can be coupled to the motor 104 in a variety of ways, both directly and indirectly. In embodiments where the handwheel 102 is directly coupled to the motor 104 (as in FIGS. 1-2), it is contemplated that the motor's output 106 (e.g., a shaft or other rotating output component) is fixedly coupled with the handwheel 102 to produce a 1:1 turning ratio between the handwheel 102 and the motor's output 106.

In some embodiments, including the one shown in FIGS. 1-2, the motor output 106 and the handwheel's axis of rotation are axially aligned, with the output 106 of the motor coupled with the handwheel 102 by a coupling component 108 that extends from the motor's output 106 to the handwheel 102 along the handwheel's axis of rotation. While the handwheel system 100 shown in FIGS. 1-2 show the motor's output 106 and the handwheel 102 as being coaxially oriented (albeit laterally offset from one another and coupled together by the coupling component 108), it is contemplated that the motor 104 and the handwheel 102 can be coupled together in many different positions and orientations, depending on the needs of a particular application. These alternative embodiments are made possible by the many different ways in which mechanical energy can be transferred from one place to another (e.g., by gears, shafts, pulleys, belts, chains, etc.).

In some embodiments—like the handwheel system 100 shown in FIGS. 1-2—the coupling component 108 that joins the output 106 of a motor to a handwheel is a separate piece from both the handwheel 102 and from the motor's output 106, but it is contemplated that it can be formed as an integral component of either or both of those components. In some embodiments, the handwheel 102 can be coupled with the motor 104 or the coupling component 108 by, for example, one or any combination of screw(s), peg(s) and slot(s), and a key and slot.

A handwheel can be coupled directly or indirectly to a motor's output. In one example of an indirect coupling, the handwheel can be coupled with an output shaft from a gearbox that is coupled with the motor. Gearboxes can be useful to modify an output shaft speed compared to the rotational speed of the motor itself, and in so doing, the output torque can be affected. A motor's output shaft and a handwheel can also be coupled by other mechanisms that transfer mechanical energy, such as a belt or chain.

In a direct coupling example, the turning of the handwheel can correspond 1:1 with the motor's output shaft in the absence of a gearbox or other mechanism that introduces a gear ratio. In an indirect coupling, the handwheel is coupled with the motor's output shaft such that the handwheel does not turn at the same rate as the motor's output. As mentioned above, this can be accomplished using, for example, a gearbox.

Because embodiments of the inventive subject matter are designed to simulate handwheel mass that is different from the handwheel's actual mass to create an apparent increase in rotational inertia of the handwheel, handwheels of the inventive subject matter can be made from lightweight materials (e.g., plastics, metals, alloys, composite materials, etc.).

Simulating mass in a handwheel system of the inventive subject matter is accomplished with the assistance of a controllable, electric motor. A wide variety of motors can be implemented in embodiments of the inventive subject matter, including: AC brushless motors, DC brushed motors, DC brushless motors, direct drive motors, servo motors, and stepper motors.

AC brushless motors are often used in motion control applications. They use induction of a rotating magnetic field, generated in the stator, to turn both the stator and rotor at a synchronous rate. They rely on permanent electromagnets to operate. In a DC brushed motor, brush orientation on the stator determines current flow. In some models, the brush's orientation relative to the rotor bar segments is decisive instead.

A direct drive motor is a high-efficiency, low-wear technology implementation that replaces conventional servo motors and their accompanying transmissions. In addition to being far easier to maintain over a longer period of time, these motors can accelerate more quickly than other types of electric motors.

Stepper motors use an internal rotor that is electronically manipulated by external magnets. The rotor can be made with, for example, permanent magnets or a soft metal. As windings are energized, the rotor teeth align with the magnetic field. This allows them to move from point to point in fixed increments.

A servo motor is any motor coupled with a feedback sensor to facilitate positioning; thus, servo motors are the backbone of robotics. Low-cost brushed DC motors are common, and brushless AC motors are often used for high-performance applications. Because embodiments of the inventive subject matter use a motor coupled with a rotation detector to provide angular position feedback to a controller, any of the motors used in embodiments of the inventive subject matter can be considered servo motors. Thus, DC brushed and brushless motors, as well as AC motors, are preferred handwheel system embodiments.

To create a closed-loop control system in handwheel systems of the inventive subject matter, a rotation detector is also included. The rotational detector is used to determine change in angular position of a rotating component. In some embodiments, the rotation detector determines a change in angular position of the handwheel, while in other embodiments, the rotation detector determines a change in angular position of the motor or motor's output shaft. The rotation detector 110 shown in FIGS. 1-2 detects rotation of the handwheel 102. The rotation detector 110 (which, as shown in FIGS. 1-2, includes a disk 110a and a sensor to detect rotation of that disk 110a) is then informationally coupled with the controller 112 where it sends angular position information, and the controller 112 can then use that information to implement a closed-loop control scheme as shown in FIG. 7. In some embodiments, the rotation detector 110 collects information about rotation of the motor 104, which can be different from the rotation of the handwheel 102 if there is any type of gearing or gear ratio at play between the two components.

A wide variety of rotation detectors are contemplated, including: a conductive encoder, an optical encoder, an on-axis magnetic encoder, and an off-axis magnetic encoder. A conductive encoder includes a series of circumferential copper tracks etched onto a printed circuit board (PCB), which is used to encode information about the handwheel's rotation. In conductive encoders, contact brushes sense the copper tracks and rotation direction and magnitude can be detected.

Optical encoders use a light that shines onto a photodiode through slits in a disk, although reflective versions also exist. Optical encoders can be sensitive to dust but are otherwise robust and easy to implement. As the disk that is fixed to a rotating component rotates, light shines through the slits allowing the rotation to be detected. Optical encoders can be configured to determine both direction of rotation and angular position/change in angular position.

On-axis magnetic encoders typically use a specially magnetized 2-pole neodymium magnet attached to the motor shaft. Because it can be fixed to the end of the shaft, it can work with motors that only have 1 shaft extending out of the motor body. The accuracy can vary from a few degrees to under 1 degree. Resolutions can be, for example, as low as 1 degree or as high as 0.09 degree. Poorly designed internal interpolation can cause output jitter, but this can be overcome with internal sample averaging.

Off-axis magnetic encoders typically use rubber-bonded ferrite magnets attached to a metal hub. This offers flexibility in design and low cost for custom applications. Due to the flexibility in many off-axis encoder chips they can be programmed to accept any number of pole widths, so the chip can be placed in any position required for the application. Magnetic encoders operate in harsh environments where optical encoders would fail to work.

As mentioned above, a closed-loop control system is created using a motor 104, a handwheel 102, a rotation detector 110, and a controller 112. It is contemplated that the rotation detector 110 and the controller 112 can be included on the same printed circuit board, as shown in FIGS. 1-2. In some embodiments, the controller is informationally coupled with the rotation detector A controller 112 can be, for example, a microprocessor, a computing device, or a solid-state controller comprising prefabricated IC components. The controller 112 is electronically and informationally coupled with both the motor 104 and the rotation detector 110, as shown in FIG. 7. For example, as the handwheel 102 is turned by a human operator (e.g., the handwheel undergoes angular position change), the rotation detector 110 collects angular position data and sends that to the controller 112, and the controller uses that information to drive the motor 104 (e.g., directly or via a motor driver circuit).

The controller 112 then interprets that information to determine information about the movement of the handwheel 102 (e.g., angular position, angular velocity, angular acceleration, or a change in any of those terms). The controller 112 then sends signals to the motor 104 to drive the motor 104 (e.g., directly or via a motor driver circuit) to bring about the effect of simulated inertia in a handwheel 102. For example, the controller 112 can drive a motor 104 in the opposite direction of the handwheel's angular position change to make it feel like the handwheel 102 is heavier than it actually is. For example, if the handwheel 102 undergoes an angular acceleration, the rotation detector 110 sends signals to the controller 112 sufficient for the controller 112 to determine the handwheel's angular position change over time so that angular acceleration can be deduced, and the controller 112 then tells the motor 104 to "brake" (e.g., apply torque in a direction opposite of the handwheel's angular acceleration—in this case, negative angular acceleration) resisting the handwheel's positive angular acceleration, giving the handwheel 102 a simulated behavior and feel to the human operator as a heavier wheel. When the handwheel 102 is turning, the controller will cause the handwheel to continue to turn as if it has a higher rotational inertia than it actually has.

As seen best in FIG. 1, the motor 104 and handwheel 102 are both coupled to a mounting bracket 114. The mounting bracket 114 can then be coupled to a structure such as a desk or other assembly that acts as a control station. It is contemplated that the mounting bracket 114 can couple the handwheel system 100 to any surface or structure. For example, it is common in the film industry for a camera system to be mounted on the end of a boom (or otherwise in a place where it is difficult or impossible for a human operator to physically and directly operate the camera). In such instances, the camera mount can include motors that electronically receive information from a handwheel system of the inventive subject matter, which can be mounted at a control station or anywhere else that is convenient for camera operation. An example of a handwheel system 800 coupled with a remotely located motor 802 is shown in FIG. 8. It is contemplated that signals can be transmitted from the handwheel system to the remotely located motor via wired or wireless connection.

As shown best in FIG. 1, a handwheel support 116 is included. The handwheel support 116, which is formed as a part of the mounting bracket 114 in FIGS. 1-2, can alternatively be fastened to the mounting bracket as a separate component, and it includes space for a bearing 118 to be fitted within it. The bearing 118 reduces rotational friction of the handwheel 102, allowing it to turn more freely when force is applied to the handwheel 102 to cause it to turn. In some embodiments, the bearing mounted within the handwheel support 116 includes moving parts (e.g., a ball bearing or a tapered roller bearing), while in others, the bearing can be a low-friction component with no moving parts (e.g., a hard plastic) designed to reduce friction between two components that are designed to rotation relative to one another (e.g., the coupling component 108 and the handwheel support 116).

Handwheel systems of the inventive subject matter can be controlled in a variety of ways to create a haptic feedback system where a handwheel feels heavier than it actually is.

Two ways to create a simulated inertia handwheel follow. One implementation is a "2-state" control system while the other is a "4-state" control system. The 2-state version is more direct: the mathematics involved are simpler and the controller can cause the motor to react to human input faster. But the 2-state version can sometimes become unstable when simulating large or small inertia compared to the actual inertia of the handwheel. The 4-state version, on the other hand, is more robust, but the consequence is that it has a less direct response to manual input to the handwheel. Both versions are described below in more detail.

In a 2-state control system, the controller keeps track of two states: the handwheel's angular position and angular velocity. The controller is updated with the information from the rotation detector to monitor these states. Information from the rotation detector is gathered at discrete timesteps (e.g., units of time having some duration that can be based on, for example, the controller's clock speed). For certain timesteps (e.g., each timestep, every other timestep, or some interval of timesteps), a difference in angular velocity from a previous step (e.g., the most recent timestep—or more recent set of timesteps, e.g., the last 2-5, 5-10, etc.—in which angular position information was gathered or for which angular velocity information was computed) is computed using angular position and time information, allowing for the derivation of a discrete time estimation of angular acceleration.

A gain is then set within the controller, where gain is a proportional value that shows the relationship between the magnitude of the input to the magnitude of the output signal at steady state. The gain is set at a level that balances reactivity and smoothness in the angular velocity and angular acceleration estimations.

The difference between the inertia torque generated by the handwheel and the one that should be simulated can thus be used to determine how much torque the motor should generate using the following equation (or some variation thereof):

$$T_m = -(J_s - J_w)\alpha(t)$$

$T_m$ is the motor torque, $J_s$ is the moment of inertia of the simulated wheel, $J_w$ is the moment of inertia of the physical wheel, and $\alpha(t)$ is the estimated angular acceleration. By implementing such a control system, a handwheel system of the inventive subject matter can tuned to behave as if the handwheel has a higher rotational inertia than it actually does. During use of a handwheel system using a 2-state control scheme, information about the handwheel's position is used (either directly or indirectly) to drive a remotely located motor to rotate according to the handwheel's position. For example, the handwheel's actual angular position can be used by a control system implemented with the remotely located motor to cause the remotely located motor to match the angular position of the handwheel (e.g., either 1:1 match or match at any other gearing ratio).

For larger inertia ratios, it has been discovered that a 4-state control scheme can be implemented for improved performance over a 2-state version. In a 4-state version, the controller keeps track of 4 states: angular position and angular velocity of the handwheel, as well as angular position and angular velocity of a virtual mass (e.g., a virtual handwheel having a higher mass than the actual handwheel). The controller uses the four states to determine how to drive the motor to cause the handwheel's actual angular position and angular velocity to match the angular position and velocity of the virtual mass.

Thus, the controller drives the motor according to a "demand input," where the demand input can include, for example, differences between the angular position and angular velocity of the handwheel and the angular position and angular velocity of the virtual mass. The greater the differences between the measured angular position and angular velocity of the handwheel and the angular position and angular velocity of the virtual mass, the harder the motor can be instructed to work to close the gap (e.g., the controller sends, either directly or indirectly, more current to the motor).

It is contemplated that any number of control schemes can be implemented in embodiments of the handwheel system described in this application, including proportional-integral-derivative controllers and versions thereof (e.g., any type of control scheme that uses one or more of proportional-integral-derivative (PID) factors to drive a motor.). Although a PID controller has three control terms (proportional, integral, and derivative), some applications use only one or two terms to provide the appropriate control. This is achieved by setting the unused parameters to zero and is called a PI, PD, P or I controller in the absence of the other control actions.

As the demand input changes, the controller, according to a control scheme, drives the motor to match the handwheel's angular position and angular velocity to the angular position and angular velocity of the virtual mass. Thus, tuning 4-state versions of the control system (e.g., tuning the gain) is similar to setting the values of a virtual spring and damper connected between the handwheel and the virtual mass.

Motion of the virtual mass can be simulated by discrete integration of angular velocity into angular position, and angular velocity can then be updated according to the forces acting on the virtual mass. Torque applied to the handwheel from the motor is interpreted as a torque acting on the virtual mass (e.g., where the handwheel and the virtual mass are modeled as if they are coupled by spring force), and damping is modeled as being applied between the virtual mass and ground. In systems with high damping, movement of the handwheel is experienced by an operator as an effect similar to a "fluid head" effect that is present on some camera mounts.

With a control system implemented to provide haptic feedback to cause the handwheel of a handwheel system to feel heavier than it actually is (e.g., having higher rotational inertia), rotation information (e.g., angular position, angular velocity, angular acceleration, and changes thereof) about the handwheel can then be transmitted (e.g., by an informational connection such as a wired or wireless connection) to a remotely located motor that controls movement of, for example, a camera system, as shown in FIGS. 9A-9C. FIGS. 9A-9C show side, rear, and top views, respectively, of a remote head 900 for a camera, the remote head 900 having motors 902, 904, & 906 configured to cause the camera 908 to tilt up and down (FIG. 9A), tilt side to side (FIG. 9B), and pan left to right (FIG. 9C) as shown by the double sided arrows in each figure. Thus, for each motor in the remote head shown in FIGS. 9A-9C, there would be an accompanying handwheel system, where the handwheel system couples to each motor in the same way as shown in FIG. 8. It is contemplated that any type of electrically controlled tilting, panning, and rotating frame (e.g., controlled using rotational movement such as via electric motors) can be controlled by handwheels of the inventive subject matter.

It is contemplated that signals transmitted from a handwheel system to a remotely located motor can include raw angular position information from a handwheel system so that the remotely controlled motor can interpret that information to control the remotely located motor, or, in some embodiments, the signals from the handwheel system can be sufficient to cause a motor driver to drive a motor without the need to interpret any rotation information (e.g., by running a control scheme such as a PID control system—or any other control system described in this application—in the handwheel system's controller to control the remotely located motor).

Remotely located motors can thus include supporting electronics (e.g., a motor driver) and, if necessary, a controller (e.g., processor and associated electronics sufficient to run a motor control system), to accommodate any signal that is received from a handwheel system. Remotely located motors can thus be caused to rotate to match the rotation of a handwheel that is included in a handwheel system of the inventive subject matter at any gear ratio. For example, if a camera mount includes two axes of rotation (e.g., panning left to right and tilting up and down), then two handwheel systems of the inventive subject matter can be implemented with two remotely located motors (e.g., located at the camera mount) to give a person remote control over movement of a camera on the camera mount, similar to the remote head 900 described above with respect to FIGS. 9A-9C.

FIGS. 3-6 show another embodiment of a handwheel system 300 of the inventive subject matter where a motor 302 is mounted within the handwheel 304 itself. This embodiment takes up less space and can easily be mounted to any surface via, for example, screws that fit into the screw holes 306 of the mounting plate 308. Handwheel systems like the one shown in FIGS. 3-6 include a motor 302, a handwheel 304, a rotation detector 310, a controller 312, and components sufficient to couple those components together, similar to the embodiment shown in FIGS. 1-2. As with the embodiment shown in FIGS. 1-2, the motor 302 remains stationary relative to the handwheel 304 when the handwheel 304 is turned. The motor 302 is coupled with the mounting plate 308 that allows the motor 302 to be fixedly coupled with another surface. Although screw holes 306 are shown, it is contemplated that any number of different types of fastening techniques and devices can be implemented (e.g., peg and slot, adhesive, clip, key and slot, etc.).

The motor 302 is mounted within the handwheel 304 such that the motor's rotational output is coaxially positioned relative to the handwheel's axis of rotation. This reduces complexity by obviating a need for additional mechanisms to transfer mechanical energy from the motor to the handwheel (e.g., gears, pulleys, chain drives, etc.), and it also makes the entire handwheel system 300 much smaller by using the space within the handwheel to house other components of the system 300. In the handwheel system shown in FIGS. 3-6, the motor's output is coupled with the handwheel 304 to result in a 1:1 ratio of rotation between the handwheel 302 and the motor's output. It is contemplated that any gear ratio desired can be implemented.

A rotation detector 310 is similarly implemented to detect rotation of the handwheel 304. The detected rotation is used, as described above with respect to FIGS. 1-2, as feedback in a closed-loop control scheme that incorporates the motor 302, the handwheel 304, the controller 312, and the rotation detector 310. The rotation detector 310 works in coordination with a disk 314 where the rotation detector detects rotation (e.g. angular position or change thereof) of the disk 314. Moving the handwheel 304 causes the rotation detector 310 to detect angular position change of the handwheel 304, and that angular position change can be used to determine angular velocity and, in some embodiments, angular acceleration (or any change thereof). This information is fed back into the controller 312 so that it can be used to control the motor's output such that the motor 302 causes the handwheel 304 to feel heavier (or lighter, if desired) than it actually is. The functioning of the embodiment shown in FIGS. 3-6 is the same as the functioning of the embodiment shown in FIGS. 1-2, except that the motor 302 is contained within the handwheel 304 to reduce the size of the handwheel system 300, overall.

The handwheel system shown in FIGS. 3-6 includes components analogous to the components described with respect to the embodiment shown in FIGS. 1-2, except in different configurations (e.g., the components are shaped differently and positioned differently within the system 300) so that the motor can be positioned within the handwheel instead of outside the handwheel. In either embodiment, the motor's output is positioned and oriented to be coaxially aligned with the axis of rotation of the handwheel 304 to reduce complexity.

Figure 10:
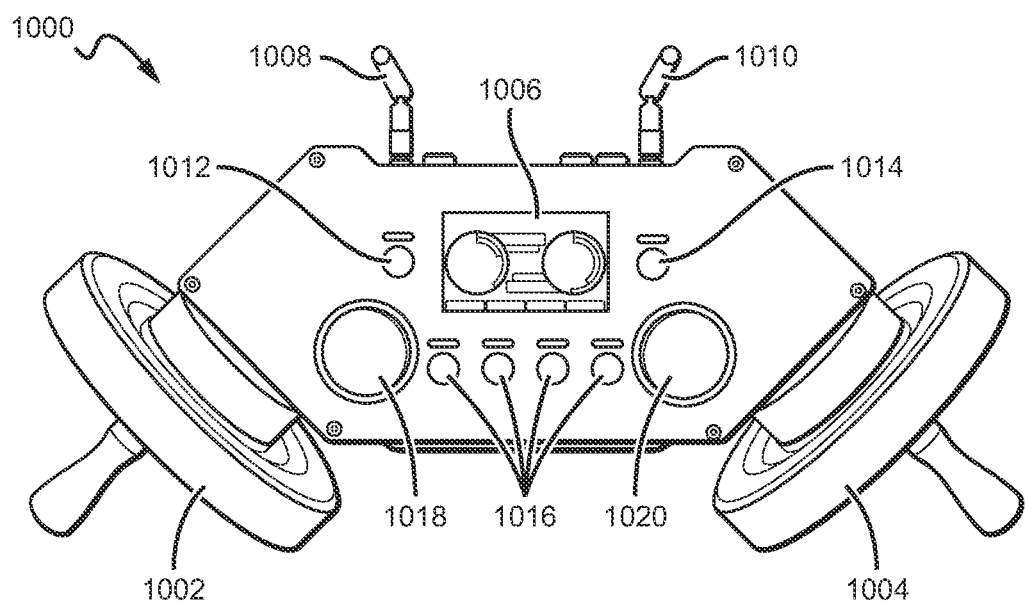
FIG. 10 shows a top view of a control console that incorporates handwheels of the inventive subject matter.
Figure 11:
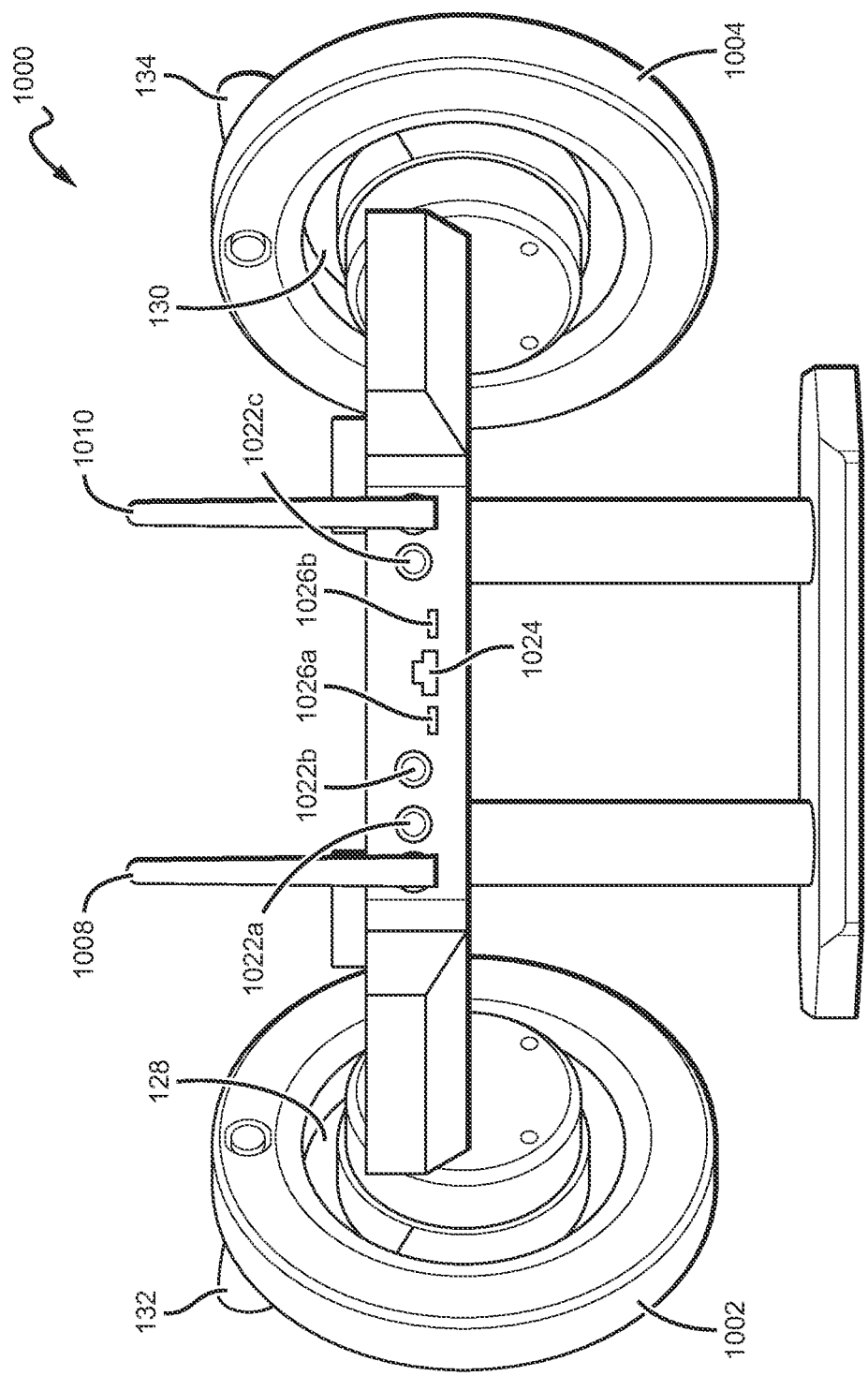
FIG. 11 shows a read view of a control console that incorporates handwheels of the inventive subject matter.

FIGS. 10 and 11 show an embodiment of a control console 1000 incorporating two handwheels of the inventive subject matter. Any of the handwheels described in this application can be incorporated into a control console of the inventive subject matter. FIG. 10, which shows a top view of a control console 1000, shows the control console 1000 can include a first handwheel 1002 a second handwheel 1004, as well as an array of inputs with a display 1006 to provide visual feedback to a user. As shown in FIG. 11, the back of the control console 1000 includes a variety of input/output ports as well as two external antennas 1008 & 1010. Control consoles of the inventive subject matter receive user inputs, allowing users to adjust a wide variety of different parameters and characteristics of the handwheels or to otherwise control a handwheel system.

As discussed above, handwheels on a control console can be configured to control remote motors that affect camera movements, though it is contemplated that control consoles of the inventive subject matter can be used to control remotely located motors or actuators for any purpose. In the context of camera control, for instance, handwheel 1002 can control a remote motor that causes a camera to pan and handwheel 1004 can similarly control camera tilt. As shown in FIG. 11, handwheels 1002 and 1004 can include cutouts 128 and 130, which help to balance weight distribution on the handwheels due to inclusion of handles 132 and 134. The top surface of the control console 1000, as shown in FIG. 10, includes a power button 1012, a menu button 1014, and an array of programmable buttons 1016. Programmable buttons 1016 can be configured to provide input to the console based on information shown on the display 1006 (e.g., "soft" inputs) and can be changed based on a user's need. In some embodiments, programable buttons 1016 can be configured to provide a static input regardless of information shown on the display 1006 (e.g., "hard" inputs) and cannot be changed. For example, the power button is a hard input because its behavior is always to turn the control console on and off. In still further embodiments, programmable buttons 1016 can include a combination of soft and hard inputs.

Control console 1000 also includes two dial inputs 1018 and 1020. Dials 1018 and 1020 can be used to adjust a variety of different characteristics of the control console 1000. For example, dial 1018 can be used to adjust the simulated mass of handwheel 1002 while dial 1020 can be used to adjust the simulated mass of handwheel 1004. But because the control console 1000 is digitally operated, dials 1018 and 1020 can be used for a variety of different purposes depending on a user's needs. For example, dial 1018 can be used to adjust simulated mass of both handwheels, and dial 1020 can be used to adjust simulated friction or damping (or both) of both handwheels.

In a hypothetical handwheel system with no friction, once turned, a handwheel would continue to turn in perpetuity or until a user applies an external force (e.g., a user can apply pressure to a handwheel to slow its turning, as-desired), whereas a system with high friction would cause a handwheel to cease turning relatively quickly after a turning force is no longer being applied. In a handwheel system that simulates zero friction, the motor incorporated into the handwheel portion of the system causes the handwheel to continue turning as if no friction exists. This represents a major advantage over purely mechanical systems that attempt to approximate zero friction but are physically unable to do so.

All inputs on the control console 1000 can be used to adjust turning behaviors of the handwheels 1002 and 1004 in a variety of different ways. As described above, dials 1018 and 1020 can be configured to adjust behaviors and characteristics of each individual handwheel separately from the other handwheel. For example, it can be beneficial for a camera system to be able to freely pan (e.g., simulated low friction for one handwheel) but tilt with some amount of friction/damping (e.g., simulated friction/damping for the other handwheel). Dials 1018 and 1020 can also behave as buttons that can be clicked in when pressure is applied to their top surfaces. In such embodiments, clicking a dial can cycle through parameters that the dial is configured to adjust by turning that dial. The clicking action can either be accomplished using a mechanical component or by tactile feedback simulating a click.

In some embodiments, display 1006 can include a touch screen to facilitate additional input. In embodiments with a touch screen display, a user can touch a value to be adjusted, which can then be adjusted using an input dial, a button, or some combination thereof. For example, the display 1006 can show a value indicating simulated inertia for one of the handwheels. A user can then touch that value and subsequently turn one of the dials to adjust that value. In some embodiments, touching a parameter (e.g., speed) on the touch screen can cause the parameter to cycle to the next parameter (e.g., damping), allowing a user to adjust the parameter using, e.g., a dial. Gesture inputs are also contemplated, which can facilitate menu navigation, allowing users to more quickly access settings and adjust handwheel properties.

In some embodiments, control console 1000 can present a dashboard via display 1006, which can allow users to assign different attributes to be adjusted using the various inputs to the console 1000. For example, each dial 1018 and 1020 can be assigned any number of attributes that the dials can adjust (e.g., 1-5 different attributers or parameters, but theoretically an unlimited number of parameters can be adjusted by a dial). To cycle between attributes, a dial can be clicked downward like a button, as discussed above, or user inputs to either the input buttons 1016, the display 1006, or some combination thereof can be used to cycle through adjustable attributes.

Buttons 1016 can have different functions assigned to them, such as functions that requires toggling (e.g., one of the buttons can be configured to toggle simulated friction on or off). These buttons 1016 can also be used to access pre-set handwheel settings. For example, if a user creates a handwheel profile, they can save that handwheel profile to the control console's memory for later access. Each saved profile can store all possible parameter and attribute settings for one or both handwheels.

Control consoles are configured with a variety of different output modes. FIG. 11, which shows the back of control console 1000, shows antennas 1008 & 1010 as well as output ports 1022*a-c*, bypass port 1024, and USB ports 1026*a-b*. Output ports 1022*a-c* can all be, e.g., LEMO ports that can be used with LEMO connectors. LEMO connectors are used in medical, industrial, audio/visual, telecommunications, military, scientific research and measurement applications. Although LEMO ports and connectors are contemplated in this application, other types of ports (standard or otherwise) can be used to bring about similar results as LEMO ports/connectors. Alternative ports that can be included are USB ports (of any standard).

Figure 12:
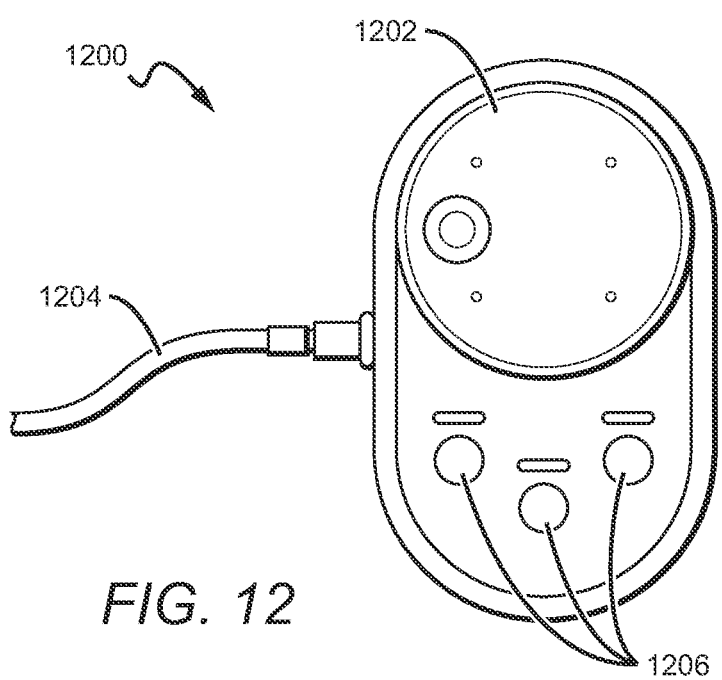
FIG. 12 shows an accessory device that can be plugged into a control console of the inventive subject matter.

As shown in FIG. 11, port 1022*a* can be used to add expansion devices to the control console 1000. For example, FIG. 12 shows an expansion accessory 1200 that adds an additional dial 1202 that can be used to adjust additional parameters related to any number of remotely controlled motors. Dial 1202 can also be clicked to cycle through different parameters like other dials described in this application. Accessory 1200 also includes several input buttons 1206 that can be used to toggle different features and parameters. Dial Accessory 1200 can couple with control console 1000 via, e.g., a LEMO port such as port 1022*a* via a wired connection using cable 1204. In some embodiments, accessory 1200 can communicate with control console 1000 wirelessly via, e.g., Bluetooth, WiFi, or another wireless communication protocol. Port 1022*b* on control console 1000 is similarly configured to facilitate connection of additional accessories that can add functionalities to the control console 1000. Port 1022*c* is configured as a power input.

Control consoles can be configured to communicate wirelessly with remote motors, remote motor controllers, or any other remote device capable of being controlled by a console of the inventive subject matter (e.g., wirelessly via the antennas 1008 & 1010 or by wired connection as described below). In some embodiments, control consoles can communicate with remote motors via wired connections, by, e.g., using port 1024. Port 1024, as shown in FIG. 11, is an RS-485 port, which is a standard defining the electrical characteristics of drivers and receivers for use in serial communications systems. Although port 1024 is depicted as an RS-485 port, port 1024 can be any other type of serial port capable of serial communication (e.g., any type of USB port). In some embodiments, both wireless and wired communications can take place simultaneously, depending on the configuration of the remote motors being controlled by the control console 1000.

Ports 1026*a* and 1026*b* are USB ports that can facilitate high speed data transfer so the control console 1000 can receive software updates. For example, port 1026*a* on control console 1000 is a USB port that allows for updates to a main processor in the control console and port 1026*b* is a USB port that allows for updates to a motor processor. Any USB standard can be implemented.

In addition to those functions and parameters discussed above, control consoles of the inventive subject matter can adjust many other different types of parameters, including parameters that can be toggled and parameters subject to adjustable ranges. A toggle is an on/off parameter while a range is a parameter that can have its boundary conditions adjusted, e.g., by a dial. Some platform-wide parameters include toggling a recording on or off and toggling handwheels on or off using, e.g., one or more of the input buttons 1016. Platform-wide parameter ranges that can be adjusted using one or more of the dials 1018 and 1020 include lens focus motor position, lens iris motor position, and lens zoom motor position.

Handwheels behave according to many different parameters that can be adjusted using toggles, dials, or both. For example, one or more input buttons 1016 can be set to toggle a handwheel recording sequence or to turn a handwheel on or off. Recording can be useful to allow users to ensure certain shots can be exactly repeated in the event of a reshoot. Regarding dials 1018 and 1020, one or more dials can be used to adjust roll rate (e.g., how quickly a handwheel can turn) and roll offset (e.g., a roll offset is used to change the horizon angle—also called the zero angle—and it is called an offset because other roll parameters can refer back to the roll offset if, for example, a Roll Reset function is called).

Input buttons 1016 can also be set to toggle: change in pan direction (e.g., reverse direction), tilt direction (e.g., reverse direction), set/clear limit up (e.g., setting the "Tilt Up" limit takes a current tilt position and makes that tilt position a maximum allowable upper camera position), set/clear limit down, set/clear limit left, set/clear limit right, and neutral gear.

A neutral gear can be implemented to disengage a handwheel from actively controlling a camera position. Including a neutral gear allows an operator to, e.g., set one or more handwheels to desirable hand positions. For example, when an operator knows that they are going to rotate the wheel three times to the right and land with the handle at 12'oclock to catch the intended action, they can toggle a neutral gear to facilitate that action. Dials 1018 and 1020 can be used to adjust pan smoothing, tilt smoothing, and limit softening.

Limit setting is a parameter unique to embodiments of the inventive subject matter. With mechanical heads implemented in mechanical camera control systems, there is no limit to the number of revolutions a handwheel can undergo. Setting rotation limits can be helpful for a camera operator in several ways. For example, if the operator needs to hit an exact frame (e.g., stop a camera's rotation at an exact position to capture a carefully framed shot), that operator can rely on the digital system to bring the camera to a stop at exactly the right point. In another example, if a camera operator needs to react to a scene and wants to keep something out of frame, they can set limits to prevent looking outside of a certain window.

Limit setting can be accomplished via software in association with hardware components such as the rotation detector and the motor that are coupled with a particular handwheel. Limits can be set for one or more handwheels. In some embodiments, limits do not cause handwheels to stop rotating, and instead simply stop a remote motor from turning once a handwheel has turned up to a limit. Thus, a handwheel rotates causing a remote motor to turn, and once the handwheel passes the software limit, the handwheel continues to turn, but the remote motor no longer turns. This allows an operator to smoothly transition a shot from one frame to another.

Thus, once a handwheel passes a limit, the wheel no longer controls the camera's position directly and new behaviors arise: the operator can be required to turn the handwheel back in the opposite direction of the original turn until the handwheel is back within the limit, thus allowing the operator to regain direct, proportional control of the camera; or the handwheel can regain control as soon as it is rotated in the opposite direction at all. Handwheel behavior after passing a limit can be user-defined based on a user's preference.

Two types of limits are contemplated: hard limiting and soft limiting. With a hard limit set, as a handwheel is rotated past a limit, the system stops the camera-controlling motor associated with that handwheel immediately, and the wheel continues to move due to inertia, as described above. In addition, the motor incorporated into the handwheel can then begin to brake the handwheel. Braking can be complicated because the motor must simulate rotational inertial while simultaneously apply braking. Once a rotation detector measures zero rotational velocity of a handwheel, it indicates the motor has succeeded in bringing the handwheel to a stop, and the motor then rotates the handwheel back to the exact rotational position of the camera (e.g., back to the handwheel's rotational position when it reached the limit). Next, in some embodiments, when the rotation detector indicates that the position of the handwheel and the position of the camera match (e.g., the handwheel has been rotated back to the limit's position), user control is restored to the handwheel. In some embodiments, the reset process described above can occur in, e.g., under 5 seconds (preferably under 2 seconds) with no burden on the operator.

Soft limits, on the other hand, can be set to bring a camera to a gentle stop. As a handwheel approaches a soft limit, it enters a predetermined range of angular positions before the soft limit. Once the handwheel's angular position is within that range, the handwheel motor will begin to brake the wheel. Because one of the motors controlling the camera is controlled by the handwheel, the camera begins to slow according to the slowing handwheel. In some embodiments, as the wheel continues to approach the soft limit, the handwheel's motor causes the handwheel to slow further. Finally, the handwheel is brought to a gentle stop at the soft limit, where the gentleness of the stop can be pre-set by an operator. For example, an operator can set the range of angular positions in which the handwheel is slowed, and the operator can also cause the handwheel to slow linearly, asymptotically, etc., according to the implemented control system (e.g., PID, PI, PD, P or I controllers).

With a soft limit set, an operator never loses control. Instead, the operator maintains direct control of the handwheel, and the operator physically can feel not only the soft limit, but also the braking force applied to gently slow the camera.

Regarding handwheel behavior, dials 1018 and 1020 can be used to adjust: tilt drag, tilt mass, pan drag, and pan mass top give the system the apparent mechanical behaviors of any physical system. Link tilt mass/drag to pan (e.g., this can make both the pan and tilt motor parameters (i.e., mass/drag) the same across multiple handwheels) can be toggled using at least one input button 1016. Finally, the control console 1000 can be used to reboot motor drivers and clear motor errors by, e.g., selecting a function from a menu and pressing an input button 1016 linked to that function, by clicking in a dial, or by providing input to a touch screen.

Systems of the inventive subject matter can additionally incorporate a variety of camera effects. A control console 1000 can include the ability to select different effects such as standing, walking, running, and riding in a car, each of which involves pre-programmed behaviors for the remote motors and causes a camera to imitate a camera that is hand-held by an operator taking part in those activities while filming. In some embodiments, handwheels 1002 and 1004 move according to the selected effect, while in other embodiments, only the remote motors move according to the selected effect, allowing an operator to control the camera normally despite its currently applied effect.

Thus, a user can customize a control console 1000 based on their specific needs. For example, a veteran camera operator focused on making a difficult shot that involves a tilt limit and a whip pan may need to quickly change handwheel parameters to allow the operator to quickly or even instantly lighten the handwheels. In such a case, the dial on the right can be configured to adjust pan speed, mass, and limit softening, while the dial on the left can be configured to adjust tilt speed and drag. The input buttons can be set to toggle two motor presets, a tilt up limit, and a tilt down limit.

In another example, a drone operator focused on controlling a camera with a limited crew might configure the console such that the right dial can adjust pan speed, mass, and zoom, while the left knob can adjust tilt speed, drag, and iris. The input buttons can thus be configured to toggle two motor presets, record start/stop, and tilt down limit.

In another example, a camera operator shooting a music video can configure the console to facilitate different camera effects. The right dial can be configured to adjust pan speed, roll rate, and shake speed, while the left knob can be configured to adjust tilt speed, roll speed, and shake intensity. Input buttons can be configured to toggle roll reset and neutral gear.

Thus, specific systems and methods of simulating increased mass of a handwheel to create a lightweight, haptic feedback-enabled handwheel system have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A control console for a remote camera head comprising:
   a console body;
   a handwheel coupled to the console body;
   wherein if the handwheel undergoes an angular rotation, a rotation detector sends angular position information-signals to a controller so that a motor brakes to resist a handwheel angular acceleration and to give the handwheel a simulated mass corresponding to heavier wheel feel.

2. The control console of claim 1, further comprising at least one antenna to facilitate wireless communication with the remote camera head.

3. The control console of claim 1, wherein the handwheel is prevented from rotating past a hard limit by the controller and the motor.

4. The control console of claim 1, wherein the console body further comprises a second input element.

5. The control console of claim 1, wherein the console body comprises an input element disposed thereon.

6. The control console of claim 5, wherein a simulated mass of the handwheel and a pan speed of the remote camera head can be changed independently via the input element.

7. The control console of claim 1, wherein the handwheel is configured to remotely control the remote camera head.

8. A control console for a remote camera head comprising:
   a console body;
   a handwheel coupled to the console body;
   wherein if the handwheel undergoes an angular rotation, a rotation detector sends angular position information to a controller so that a motor brakes to resist the angular rotation and to give the handwheel a simulated behavior corresponding to a simulated mass.

9. The control console of claim 8, further comprising at least one antenna to facilitate wireless communication with the remote camera head.

10. The control console of claim 8, wherein the handwheel is prevented from rotating past a hard limit by the controller and the motor.

11. The control console of claim 8, wherein the console body further comprises a second input element.

12. The control console of claim 8, wherein the console body comprises an input element disposed thereon.

13. The control console of claim 12, wherein a simulated mass of the handwheel and a pan speed of the remote camera head can be changed independently via the input element.

14. The control console of claim 8, wherein the handwheel is configured to remotely control the remote camera head.

* * * * *